US009485734B2

(12) United States Patent
Park (10) Patent No.: US 9,485,734 B2
(45) Date of Patent: Nov. 1, 2016

(54) WIRELESS COMMUNICATION SYSTEM METHOD FOR SYNCHRONIZING BLUETOOTH DEVICES BASED ON RECEIVED BEACON SIGNALS
(71) Applicant: INTEL CORPORATION, Santa Clara, CA (US)
(72) Inventor: Minyoung Park, Portland, OR (US)
(73) Assignee: Intel Corporation, Santa Clara, CA (US)
( * ) Notice: Subject to any disclaimer, the term of this patent is extended or adjusted under 35 U.S.C. 154(b) by 0 days.
(21) Appl. No.: 14/319,801
(22) Filed: Jun. 30, 2014
(65) Prior Publication Data
US 2015/0382304 A1 Dec. 31, 2015
(51) Int. Cl.
*H04W 52/02* (2009.01)
*H04W 56/00* (2009.01)
*H04W 4/00* (2009.01)
(52) U.S. Cl.
CPC ......... *H04W 52/0248* (2013.01); *H04W 4/008* (2013.01); *H04W 52/0229* (2013.01); *H04W 56/001* (2013.01)
(58) Field of Classification Search
CPC ........... H04W 8/005; H04W 56/0015; H04W 56/002; H04W 4/008; H04M 1/7253; H04M 2250/02; Y02B 60/50; H01Q 1/2291
See application file for complete search history.

(56) References Cited

U.S. PATENT DOCUMENTS

| | | | | |
|---|---|---|---|---|
| 9,042,829 B2* | 5/2015 | Palin | ................. | H04W 4/008 370/252 |
| 2006/0040656 A1* | 2/2006 | Kotzin | .............. | H04W 52/0216 455/426.2 |
| 2007/0011335 A1* | 1/2007 | Burns | .................... | H04W 76/02 709/227 |
| 2007/0112962 A1* | 5/2007 | Lewontin | ................ | H04L 69/16 709/227 |
| 2008/0225768 A1* | 9/2008 | Wentink | ............ | H04W 52/0216 370/311 |
| 2011/0163847 A1* | 7/2011 | Park | .................. | H04W 52/0216 340/7.34 |
| 2011/0310741 A1* | 12/2011 | Ko | ........................ | H04W 84/12 370/235 |
| 2012/0328061 A1* | 12/2012 | Chow | .............. | H04W 56/0015 375/354 |
| 2012/0331166 A2* | 12/2012 | Stirbu | ..................... | H04W 8/18 709/230 |
| 2013/0109313 A1* | 5/2013 | Kneckt | ................. | H04W 8/005 455/41.2 |
| 2013/0182798 A1* | 7/2013 | Lozano | ............... | H04L 65/4084 375/340 |
| 2013/0230035 A1* | 9/2013 | Grandhi | ................ | H04W 48/16 370/338 |
| 2013/0301833 A1* | 11/2013 | Wong | .................... | H04W 12/04 380/255 |
| 2013/0308530 A1* | 11/2013 | Yang | ....................... | H04W 8/22 370/328 |
| 2013/0331031 A1* | 12/2013 | Palin | ................ | H04W 52/0245 455/41.2 |
| 2014/0003343 A1* | 1/2014 | Kwon | ................... | H04W 40/02 370/328 |
| 2014/0112226 A1* | 4/2014 | Jafarian | ............ | H04W 52/0225 370/311 |
| 2014/0112229 A1* | 4/2014 | Merlin | ............. | H04W 52/0209 370/311 |
| 2014/0120962 A1* | 5/2014 | Merlin | .................. | H04W 68/02 455/466 |
| 2014/0146727 A1* | 5/2014 | Segev | ............... | H04W 52/0229 370/311 |
| 2014/0192694 A1* | 7/2014 | Pantelidou | ........ | H04W 52/0216 370/311 |
| 2014/0199967 A1* | 7/2014 | Varoglu | ................ | H04W 12/06 455/411 |
| 2014/0341234 A1* | 11/2014 | Asterjadhi | ............ | H04L 69/324 370/474 |
| 2015/0049644 A1* | 2/2015 | Lee | ................... | H04W 72/0446 370/256 |
| 2015/0098459 A1* | 4/2015 | Lee | ....................... | H04W 48/14 370/338 |
| 2015/0245282 A1* | 8/2015 | Kim | ....................... | H04W 48/16 370/338 |
| 2016/0014773 A1* | 1/2016 | Seok | ................. | H04W 52/0216 370/338 |

FOREIGN PATENT DOCUMENTS

WO WO 2014089252 A1 * 6/2014 .......... H04W 56/001

* cited by examiner

Primary Examiner — Bobbak Safaipour
Assistant Examiner — Devan Sandiford
(74) Attorney, Agent, or Firm — SLGIP (57) ABSTRACT The disclosure generally relates to a method and apparatus for Low-Energy Bluetooth (BLE) synchronization. In one embodiment, the disclosure enables BLE devices enabled with both BLE and IEEE 802.11 radios to synchronization using a non-BLE beacon signal. The beacon signal and available shared information between corresponding BLE devices are used to synchronize the BLE devices. In an exemplary method, the first BLE device receives a beacon signal having a reference timestamp and determines a first time-offset as a function of the reference timestamp. The first BLE device then selects an event time window as a function of the first time-offset and conducts a BLE event (advertising or scanning) during the event time window. The second BLE device also uses the beacon signal and the shared information to complement the first device's event by one of advertising or scanning.

21 Claims, 6 Drawing Sheets

WIRELESS COMMUNICATION SYSTEM METHOD FOR SYNCHRONIZING BLUETOOTH DEVICES BASED ON RECEIVED BEACON SIGNALS

BACKGROUND

1. Field

The disclosure relates to a method, apparatus and system to synchronize Bluetooth (BT) devices. Specifically, the disclosure relates to a method, apparatus and system to synchronize BT and low energy Bluetooth (BLE) devices using extraneous beacon signals.

2. Description of Related Art

Bluetooth low energy technology provides connectivity between BT mobile devices and a variety of Bluetooth systems, including, cars, exercise devices, computers, tablets and the like. The BLE technology supports a relatively low power consumption of the BT mobile devices. For example, a BT mobile device may be a small sensor, a watch, or a Smartphone having a battery with limited power supply and the BLE technology may enable the BT mobile device to communicate with the variety of systems using a relatively low power consumption.

With the emergence of applications around social networking, Internet of Things (IoT), wireless docking and the like, there is a need to design low power solutions that can be continually on. There is a growing need for an improved, low power service discovery mechanism using BT technology to advance Wi-Fi and other communication modes. Since most mobile devices have integrated BT and Wi-Fi (and/or WiGig), it is possible to design an efficient and scalable mechanism that uses BT and Wi-Fi (and/or cellular or WiGig) to significantly reduce device power consumption.

According to the BLE technology protocol, a first BT device (the BLE central device) and a second BT device (BLE peripheral device) may establish a connection therebetween to enable data exchange. Exchanging data between the BLE central device and the BLE peripheral device at a relatively high rate may increase power consumption of each device and will rapidly deplete battery life.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Certain embodiments may be used in conjunction with various devices and systems, for example, a Personal Computer (PC), a desktop computer, a sensor device, a BT device, a BLE device, an Ultrabook™, a mobile computer, a laptop computer, a notebook computer, a tablet computer, a server computer, a handheld computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like. Some embodiments may be used in conjunction with devices and/or networks operating in accordance with existing Bluetooth standards ("the BT standards") as will be discussed further below, e.g., including BT specification V 1.0, Dec. 1, 1991, BT specification V 4.0, Jun. 30, 2010, and/or future versions and/or derivatives thereof.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12-TGac Channel Model Addendum Document"); IEEE 802.11 task group ad (TGad) (IEEE P802.11ad-2012, IEEE Standard for Information Technology-Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, a BT device, a BLE device, cellular radio-telephone communication systems, a mobile phone, a cellular telephone, a wireless telephone, a 612005 Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Figure 1:
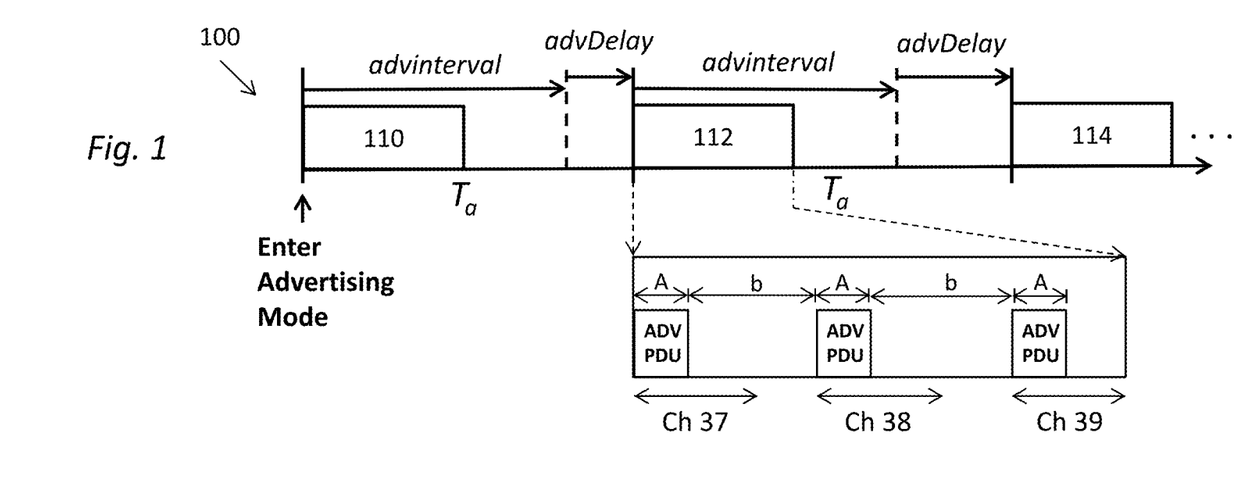
FIG. 1 schematically illustrates an advertising process and a BLE advertising event.

As stated, BLE is widely adopted for service and device discovery. The BLE discovery is based on the scanning and advertising processes as shown in the following figures. FIG. 1 illustrates an advertising process and a BLE advertising event. Specifically, process 100 shows advertising events 110, 112 and 114 occurring successively after a first BLE device (not shown) enters advertising mode. Each advertising mode has a predefined length of time, $T_a$. An advertising interval, adinterval, encompasses the advertising event and is followed by an advertising delay, advDelay, as shown. The advertising events occur routinely (e.g., every 100 msec.). Advertising delays have a pseudo-random value (e.g., 10 msec. or less). In FIG. 1 each advertising event is broadcasted over three different channels. By way of example, these channels are identified as channels 37, 38 and 39. Each channel includes an advertising packet data unit (PDU). Each PDU has a duration (A), followed by a non-broadcast period (b).

Figure 2:
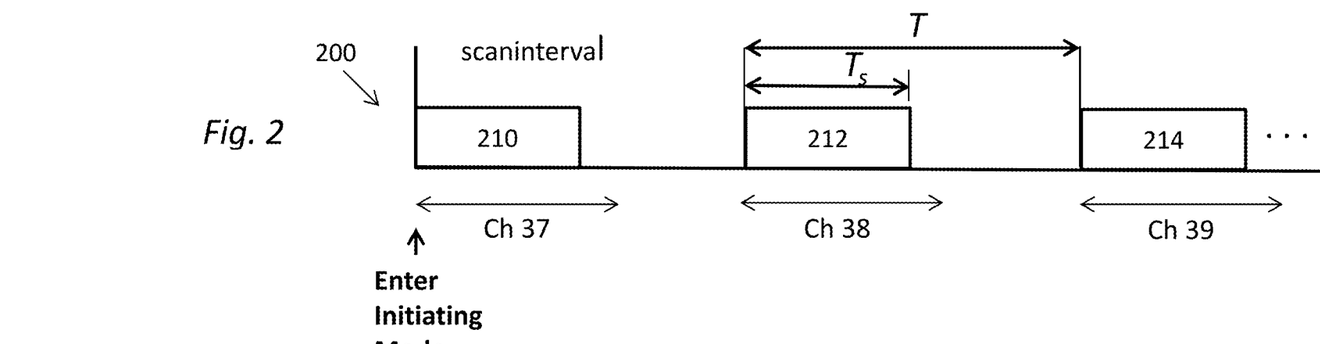
FIG. 2 shows the scanning/initiating process by a corresponding BLE device.

FIG. 2 shows the scanning/initiating process by a corresponding BLE device. Specifically, the scanning device (not shown) seeks a proximal BLE device (i.e., advertising device) by listening to the three advertising channels (i.e., channels 37, 38 and 39). Scanning process 200 begins when the scanning BLE enters initiating mode. The BLE scanner listens to one advertising channel for Scan Window duration (210, 212, 214) at every scan interval time, T. During the subsequent scan interval time, the scanning BLE listens to the next advertising channel in a round-robin fashion. The scanning device finds an advertising device only if an advertising packet is transmitted during the Scan Window (210, 212, 214) in the same advertising channel.

Depending on the selected parameters of each BLE device, the Scanning device may have to wait for a long time to find the advertising device. This is due to the fact that BLE devices do not have time or frequency synchronization between the scanner and the advertiser.

Figure 3:
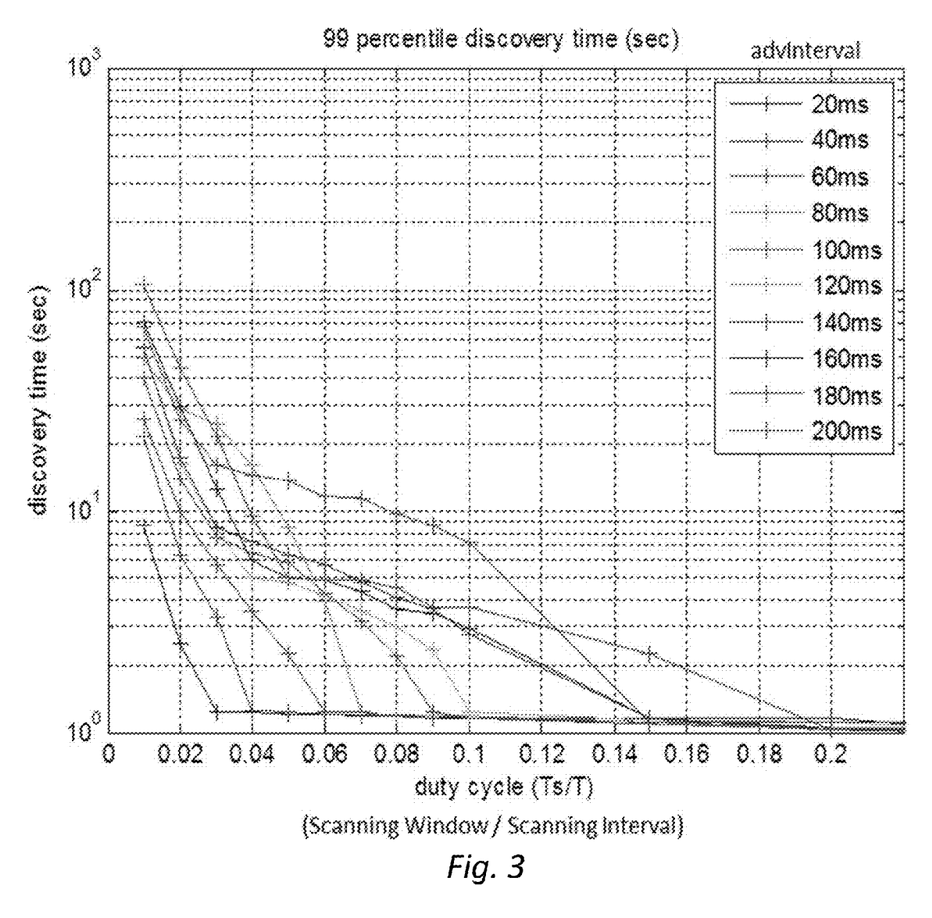
FIG. 3 illustrates the discovery time for conventional scanner and advertiser devices.

FIG. 3 illustrates the discovery time for conventional scanner and advertiser devices. The simulation result shown in FIG. 3 shows the problem clearly. For a small scanning duty-cycle (about 1%) and a large advertising interval (e.g., about 200 msec.) the discovery latency reaches up to 100 seconds which may not be acceptable for certain applications.

The latency can be reduced by increasing the scanning duty-cycle such that the scanning device has more opportunity to receive advertising packets. However, this increases the power consumption of the scanning device as the scanning device stays awake longer. Shortening the advertising interval to a very small number (e.g., 20 msec.) is another approach to reducing discovery latency. However, this approach will increase power consumption of the advertising device and increases likelihood of collision between different advertising devices.

In one embodiment of the disclosure, non-BLE radios are used to synchronize BLE devices. Non-BLE radios may include devices compliant with various IEEE 802.11 protocols which broadcast beacon signals. Such devices include smart phones, tablets, laptops, routers and access points (APs). In one embodiment, beacon signals are used to synchronize BLE devices so as to significantly reduce scanning duty-cycle (e.g., to about 1%) without increasing discovery latency. In another embodiment, the disclosure enables time synchronization among BLE devices by using timestamp information in beacon signals of compliant wireless stations (STAs) so that the BLE devices can use a low scanning duty-cycle and a large advertising interval to minimize power consumption without increasing discovery latency.

Figure 4:
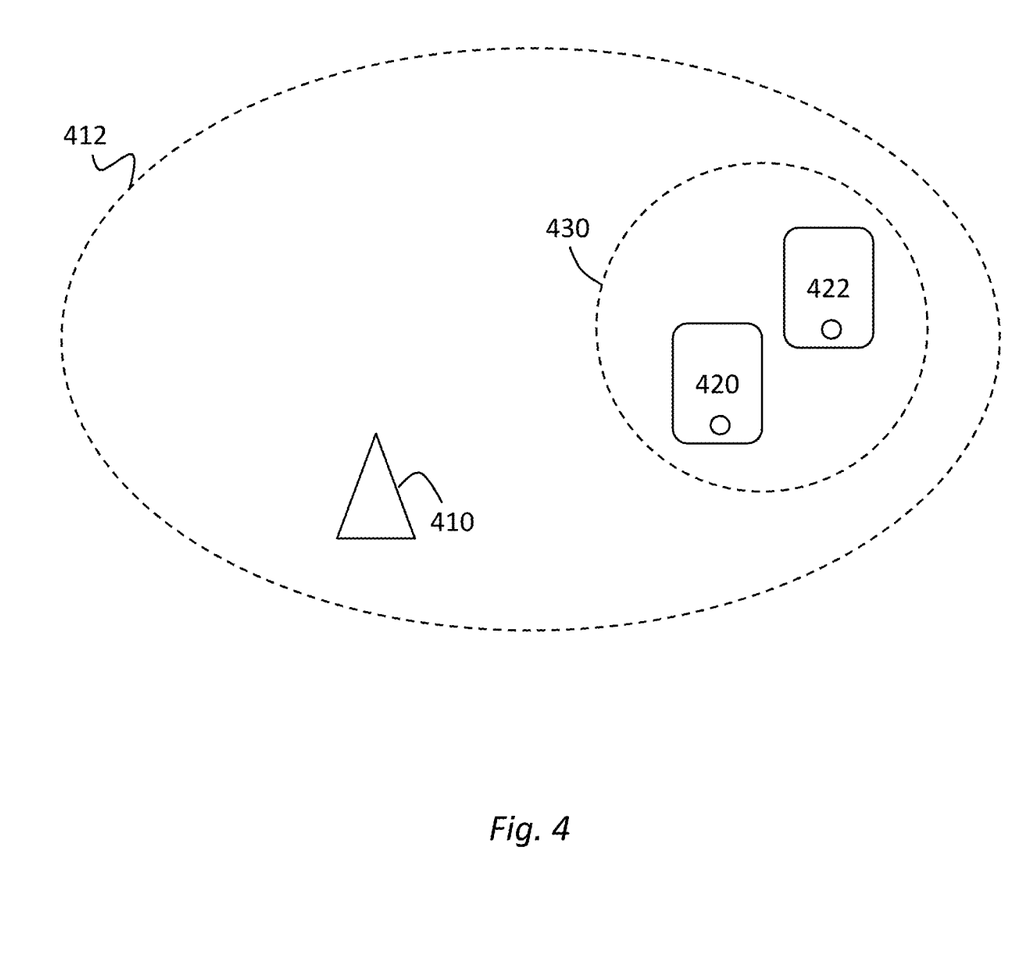
FIG. 4 shows an exemplary system for implementing an embodiment of the disclosure.

FIG. 4 shows an exemplary system for implementing an embodiment of the disclosure. Specifically, FIG. 4 shows AP 410 transmitting beacon signal (not shown) to serve area 412. STAs 420 and 422 include BLE and non-BLE radios. The STAs have a BLE signal reach identified by area 430. The embodiment of FIG. 4 can be an indoor or an outdoor environment.

In one embodiment, STAs 420 and 422 are synchronized using a non-BLE signal from AP 410. Here, the scanning device (e.g., STA 420) and the advertising device (STA 422) are assumed to know shared information, $N_0$. The shared information can be used to calculate time synchronization points based on a timestamp of a received beacon.

Sharing the information between the STAs can be done by the following exemplary and non-limiting methods: during a past discovery of each other, the two STAs determine that they belong to the same group (e.g., My_Devices) or a same user account (e.g., Apple ID or Google Play), or the STAs are running the same application and the application contains shared information, $N_0$.

In an exemplary embodiment, the shared information ($N_0$) is an n-bit sequence. For example, $N_0$ can be 20-bit sequence with all bits set to 0, (i.e., $N_0$=[0000 0000 0000 0000 0000]). In one implementation, STA 420 compares n least significant bits (LSBs) of the timestamp $N_1$ (from AP beacon signal) with $N_0$ and calculates the offset to the first synchronization point (t-sync(0)). Since AP 410 increases the timestamp value by one every 1 μsec, the n-bit LSBs of the timestamp becomes all zero every ($2^n$) μsec. Thus, scanInterval (see FIG. 1) can be set to the same value as ($2^n$). In an embodiment of the disclosure where multiple APs are near to, and in communication with, STAs 420 and 422, the STAs may synchronize to the AP with the largest timestamp value.

Figure 5:
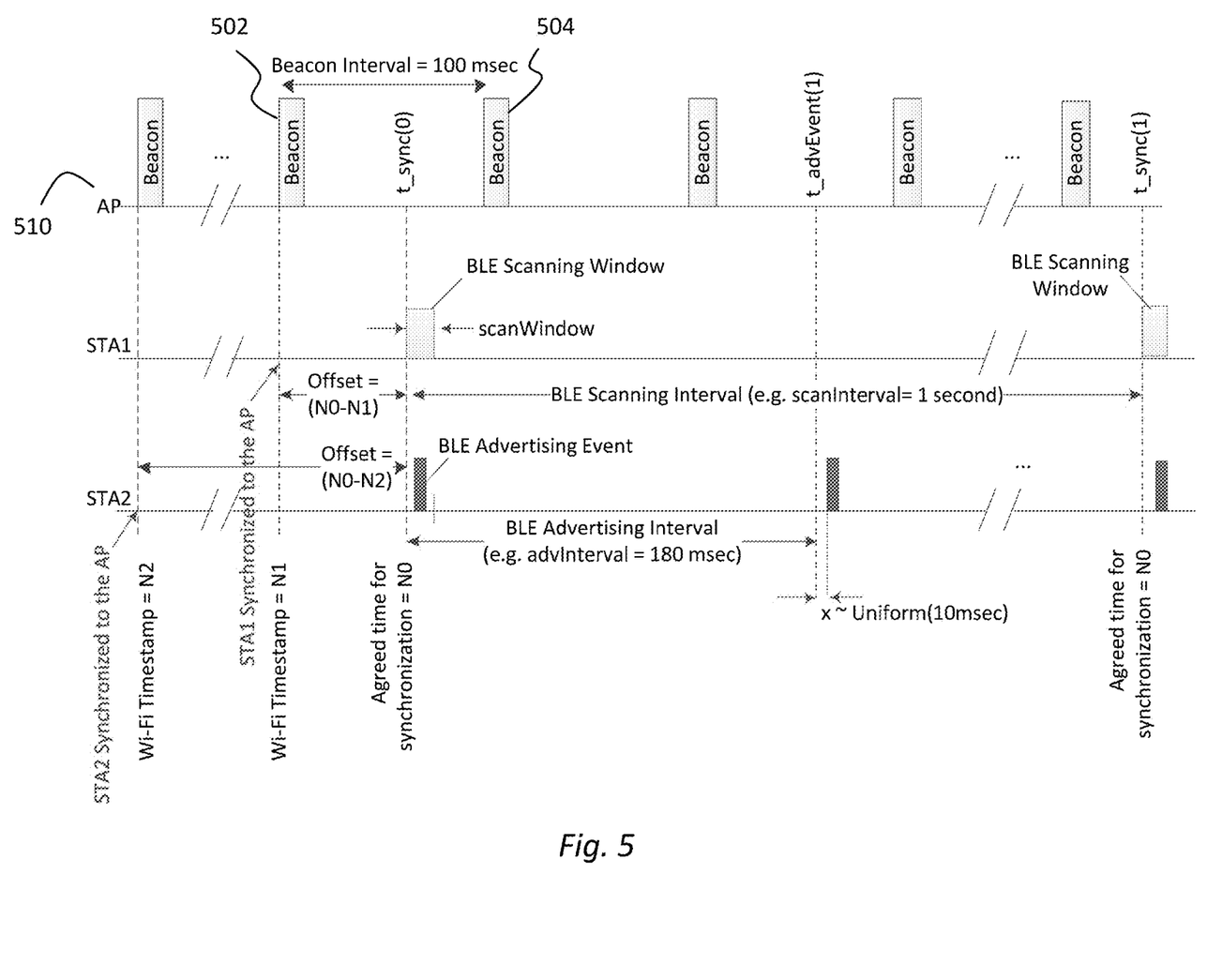
FIG. 5 shows an exemplary system implementation for the system of FIG. 4.

FIG. 5 shows an exemplary system implementation for the system of FIG. 4. In FIG. 5, AP 510 broadcasts beacon signals during regular intervals. Each beacon signal may contain timing information in compliance with the applicable non-BLE protocols (i.e., IEEE 802.11 a, ac, ah, n, etc.)

As shown on FIG. 5, the beacon signals are separated by a beacon interval of about 100 msec. Each of the STA1 and STA2 receives AP's beacon signals. For illustrative purposes, STA1 is assumed to a scanning device and STA2 is assumed to be an advertising device. As with FIG. 4, both STAs are assumed to include BLE and non-BLE radios.

During an exemplary implementation of a disclosed embodiment, the 802.11 transceiver of STA 520 scans for an 802.11 beacon by passive or active scanning Upon receiving a beacon with timestamp=$N_1$, STA1 calculates the offset time to the first synchronization point (t_sync(0), FIG. 1) by comparing the n LSBs of $N_1$ (i.e., $N_1$ [n−1:0]) against $N_0$. For example, if the 20-bit LSBs of the received timestamp is [1111 1111 0000 0000 0000], the offset to the first synchronization point is ($2^{12}$)=4096 μsec. after the time indicated by the timestamp.

Next, the 802.11 transceiver module of STA1 signals the synchronization points to the BLE transceiver. STA1's BLE receiver may sleep and wake up at t_sync(0) and stays awake for scanWindow time duration (see FIG. 1) to scan for an advertising packet. STA1 listens to the advertising channel number [37+($N_1$[n+1:n] modulo 3)].

The beginning of the next scanWindow or the second synchronization point is calculated as follows:

$$t\_sync(1)=t\_sync(0)+\text{scanInterval} \quad (1)$$

In equation (1), the scanInterval is set to ($2^n$).

The m-th synchronization point (i.e., subsequent synchronization pointe) is calculated by equation (2) as follows:

$$t\_sync(m)=t\_sync(m-1)+(2^n), \text{ where } m>0 \quad (2)$$

On the advertising side, STA2 802.11 transceiver scans for an 802.11 beacon either by passive or active scanning Upon receiving a beacon with timestamp=$N_2$, STA2 calculates the offset time to the first synchronization point t_sync (0) by comparing the n LSBs of $N_2$ (i.e., $N_2$ [n−1:0]) against $N_0$. For example, if the 20-bit LSBs of the received timestamp was [1111 0000 0000 0000 0000], the offset to t_sync(0) is ($2^{16}$)=65,536 μsec after the time indicated by the received timestamp.

The 802.11 transceiver module of STA2 signals the synchronization points to the BLE transceiver. STA2's BLE transceiver may sleep until the beginning of the first advertising event t_advEvent(0), which is calculated as follows:

$$t\_advEvent(0)=t\_sync(0)+x \quad (3)$$

In equation (3), x is a pseudo-random number (e.g., x~Uniform(10 msec.)).

At the first advertising event t_advEvent(0), STA2 wakes up and transmits advertisement packets on the advertising channels. STA2 may just transmit one advertising packet on the advertising channel number [37+($N_2$[n+1:n] modulo 3)], which is synchronized in frequency with STA1.

The beginning of the second advertising event t_advEvent (1) before the second synchronization point t_sync(1) is calculated as follows:

$$t\_advEvent(1)=t\_sync(0)+\text{advInterval}+x \quad (4)$$

The beginning of the p-th advertising event t_advEvent (p), before the m-th synchronization time t_sync(m) (see FIG. 1) is calculated as follows:

$$t\_advEvent(p)=t\_sync(m-1)+p\times\text{advInterval}+x \quad (5)$$

In equation (5), t_sync(m)=t_sync(m−1)+($2^n$).

The beginning of the first advertising event t_advEvent m(0) after the m-th synchronization time t_sync(m) is calculated as follows:

$$t\_advEvent\_m(0)=t\_sync(m)+x \quad (6)$$

Since STA1 and STA2 are synchronized at the synchronization points t_sync(m), STA1 can use a small scanWindow size but still receive the advertising packet within the maximum discovery latency of scanInterval ($2^n$).

The implementation of FIG. 5 can be readily used for low power service discovery and power consumption optimization without incurring discovery latency. The implementation may also be applied to synchronizing multiple BLEs.

In one embodiment, the steps of FIG. 5 is implemented at one or more processor and circuitry to synchronize communication with another apparatus. Both apparatus may support a first wireless communication protocol and a second wireless communication protocol. The first wireless communication protocol may define BLE and the second wireless communication protocol may define Wi-Fi. The processor and the circuitry may resided in both the first and the second apparatus. In one embodiment, the second wireless communication protocol broadcasts beacon signals in compliance with the Wi-Fi protocol. The circuitry may be configured to determine a first time-offset value from a broadcast beacon signal in compliance with a second wireless communication protocol. The processor and/or the circuitry may select an event time window as a function of the first time-offset value. Finally, the processor and/or the circuitry may then conduct communication with the other apparatus in compliance with the first wireless communication protocol during the event time window. The processor and/or circuitry may be further configured transmit a BLE advertisement or to scan for a BLE advertisement. The processor and/or the circuitry may further be configured to determine the first time-offset as a function of one or more least significant bits of a shared time data ($N_0$) communicated by the broadcast beacon signal. The shared time data ($N_0$) may be communicated between the apparatus. When applicable, the circuitry may be configured to select one of a plurality of beacon signals to provide a large timestamp value. Finally, the processor and/or the circuitry may be configured to selectively place a part of the processor in sleep mode when inactive.

Figure 6:
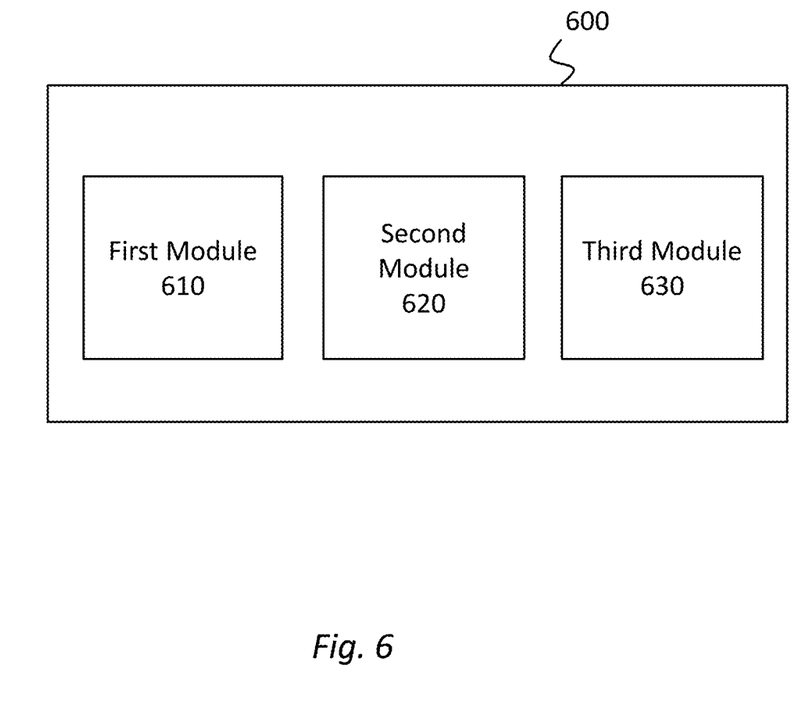
FIG. 6 schematically illustrates a device for implementing an embodiment of the disclosure.

FIG. 6 schematically illustrates a device for implementing an embodiment of the disclosure. Specifically, FIG. 6 shows device 600 which can be an integral part of a larger system or can be a stand-alone unit. For example, device 600 can define a system on chip configured to implement the disclosed methods. Device 600 may also be part of a larger system having multiple antennas, one or more radios and a memory system. Device 600 may be define a software or an App. In one embodiment, device 600 defines an APP firmware or an independent APP configured to accommodate legacy systems.

Device 600 includes first module 610, second module 620 and third module 630. Modules 610, 620 and 630 can be hardware, software or a combination of hardware and software (i.e., firmware). Further, each of modules 610, 620 and 630 can define one or more independent processor circuits. In an exemplary embodiment, at least one of the modules includes a processor circuitry and a memory circuitry in communication with each other. In another embodiment, modules 610, 620 and 630 define different parts of the same data processing circuit. In still another exemplary embodiment, device 600 can be integrated with an AP or with a BLE device.

Device 600 may be integrated with an existing 802.11 system having multiple radios, including BLE and non-BLE radios. For example, device 600 may be configured to synchronize an advertising BLE device with a scanning BLE device. First module 610 may be configured to determine a first time-offset value from a broadcast non-BT signal. The first time offset can be determined in accordance with the process of FIG. 5. Second module 620 may use information from first module 610 to select an event time window as a function of the first time-offset value. Third module 630 may conduct BLE event during the activity time window. The BLE event can be conducted through the BLE signal and may include BLE synchronization information as discussed above.

In an exemplary implementation, third module 630 remains in sleep mode during operations of first and second modules and awaken only to conduct the BLE event. Device 600 may include a controller circuit (not shown) to selectively activate or put to sleep one or more of modules 610, 620 and 630.

The BLE event may define one or more of BLE advertising or scanning events. In another embodiment, second module 620 is further configured to determine the first time-offset as a function of one or more least significant bits of a shared time data ($N_0$) communicated by the non-BT signal. Second module 620 may communicate shared time data ($N_0$) to the corresponding BLE device. In still another embodiment where multiple synchronization signals are available, the first module may select the beacon signal that provides the largest timestamp value.

Figure 7:
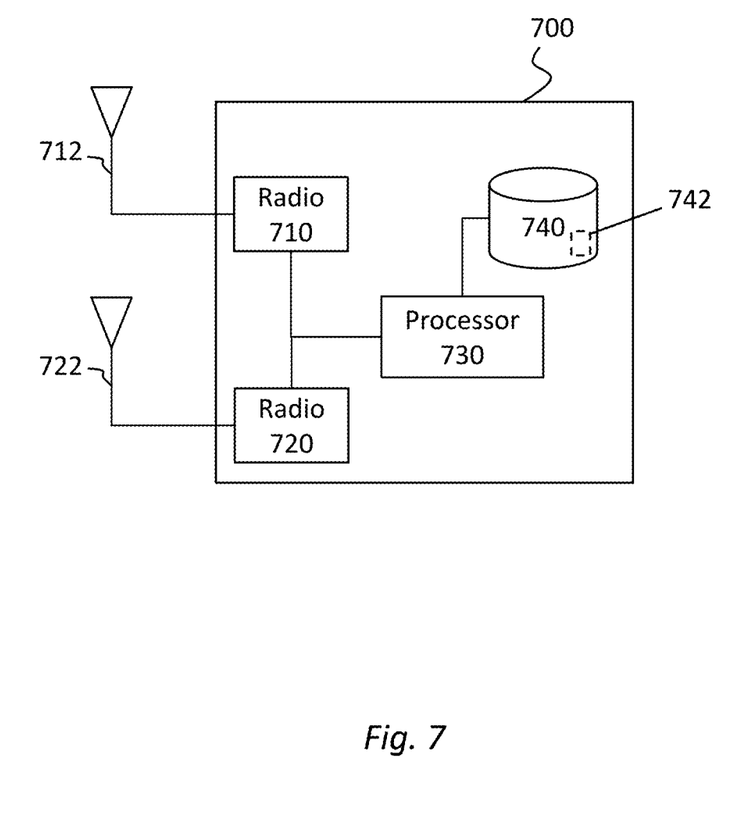
FIG. 7 schematically shows a system for implementing one embodiment of the disclosure.

FIG. 7 schematically shows a system for implementing one embodiment of the disclosure. For example, the steps of any of disclosed implementations may be implemented at the system of FIG. 7. System 700 of FIG. 7 may define a mobile device such as an AP, a router, smartphone, a tablet or any device capable of BLE and non-BLE communication. While system 700 is shown with antennas 712 and 722, the disclosure is not limited to having two antennas. Multiple antennas can be added to system 700 such that different signals for different protocols can be received at different antennas.

The signal(s) received at antenna 710 are relayed to radio 720. Radio 720 may include transceiver components such as front-end receiver components or a receiver/transmitter. Though not shown, radio 710 may include multiple radios. Radio 720 may convert analog signals (BLE and non-BLE signals) to a digital data stream and direct the data stream to processor 730. Processor 730 may include one or more modules as well as a controller module as discussed in relation to FIG. 6. Processor 730 may also communicate with memory circuit 740. While shown as a separate circuitry in the exemplary system of FIG. 7, it should be noted that instructions 742 can be embedded on processor 730 as firmware to obviate the addition of memory circuit 740.

Memory circuit 740 may contain instructions 742 for processor 730 to implement one or more of the steps of the exemplary methods disclosed herein. Memory circuit 740 may define a non-transitory computer readable medium containing a set of instructions to processor 730 to perform a process comprising: (1) receive, at the first BT/BLE device, a beacon signal having a reference timestamp; (2) determine a first time-offset for the first BT/BLE device as a function of the reference timestamp; (3) select an event time window as a function of the first time-offset; and (4) conduct a BT event using a BT/BLE signal during the event time window.

In another embodiment, system 700 may be configured to synchronize a BT/BLE device by providing one or more antennas to transceive a beacon signal and a BT/BLE signal. Radio(s) 710 receives the beacon signal and the BT/BLE signal from the corresponding antennas. Processor 720 communicates with radio(s) 710 and determines a first time-offset from the beacon signal, selects an event time window as a function of the first time-offset, and conducts a BT event during the activity time window.

The following examples pertain to further embodiments of the disclosure. Example 1 relates to an apparatus including one or more processors and circuitry to synchronize communication with another apparatus in compliance with a first wireless communication protocol, the circuitry configured to: determine a first time-offset value from a broadcast beacon signal in compliance with a second wireless communication protocol; select an event time window as a function of the first time-offset value; and conduct communication with the other apparatus in compliance with the first wireless communication protocol during the event time window.

Example 2 relates to the apparatus of example 1, wherein the first wireless communication protocol is Bluetooth low energy (BLE) and second first wireless communication protocol is Wi-Fi.

Example 3 relates to the apparatus of example 1, wherein the circuitry is further configured to one of transmit a BLE advertisement or to scan for a BLE advertisement.

Example 4 relates to the apparatus of example 1, wherein the circuitry is further configured to determine the first time-offset as a function of one or more least significant bits of a shared time data ($N_0$) communicated by the broadcast beacon signal.

Example 5 relates to the apparatus of example 4, wherein the circuitry is further configured to communicate the shared time data ($N_0$) to the other apparatus.

Example 6 relates to the apparatus of example 1, wherein the circuitry is further configured to select one of a plurality of beacon signals to provide a large timestamp value.

Example 7 relates to the apparatus of example 1, wherein the circuitry is further configured to selectively place a part of the processor in sleep mode when inactive.

Example 8 relates to a system to synchronize a Low-Energy Bluetooth (BLE) device, comprising: a memory; a first radio to communicate in compliance with a first wireless communication protocol and a second radio to communicate in compliance with second wireless communication protocol; one or more processors and circuitry to synchronize communication with another apparatus in compliance with a first wireless communication protocol, the circuitry configured to: determine a first time-offset value from a broadcast beacon signal in compliance with a second wireless communication protocol; select an event time window as a function of the first time-offset value; and conduct communication with the other apparatus in compliance with the first wireless communication protocol during the event time window.

Example 9 relates to the system of example 8, further comprising one or more antennas to receive the broadcast beacon signal.

Example 10 relates to the system of example 8, wherein the first wireless communication protocol is Bluetooth low energy (BLE) and second first wireless communication protocol is Wi-Fi.

Example 11 relates to the system of example 8, wherein the circuitry is further configured to one of transmit a BLE advertisement or to scan for a BLE advertisement.

Example 12 relates to the system of example 8, wherein the circuitry is further configured to determine the first time-offset as a function of one or more least significant bits of a shared time data ($N_0$) communicated by the broadcast beacon signal.

Example 13 relates to the system of example 12, wherein the circuitry is further configured to communicate the shared time data ($N_0$) to the other apparatus.

Example 14 relates to the system of example 8, wherein the circuitry is further configured to select one of a plurality of beacon signals to provide a large timestamp value.

Example 15 relates to the system of example 8, wherein the circuitry is further configured to selectively place a part of the processor in sleep mode when inactive.

Example 16 relates to a tangible machine-readable non-transitory storage medium that contains instructions, which when executed by one or more processors result in performing operations comprising: determining a first time-offset value from a broadcast beacon signal in compliance with a second wireless communication protocol; selecting an event time window as a function of the first time-offset value; and communicating with the other apparatus in compliance with a first wireless communication protocol during the event time window.

Example 17 relates to the tangible machine-readable non-transitory storage medium of example 16, wherein the first wireless communication protocol is Bluetooth low energy (BLE) and second first wireless communication protocol is Wi-Fi.

Example 18 relates to the tangible machine-readable non-transitory storage medium of example 16, wherein the instructions further result in transmitting a BLE advertisement or to scan for a BLE advertisement.

Example 19 relates to the tangible machine-readable non-transitory storage medium of example 16, wherein the instructions further result in determining the first time-offset as a function of one or more least significant bits of a shared time data ($N_0$) communicated by the broadcast beacon signal.

Example 20 relates to a method to synchronize a first Low-Energy Bluetooth (BLE) apparatus with another apparatus in compliance with a first wireless communication protocol device, the method comprising: determining a first time-offset value from a broadcast beacon signal in compliance with a second wireless communication protocol; selecting an event time window as a function of the first time-offset value; and communicating with the other apparatus in compliance with the first wireless communication protocol during the event time window.

Example 21 relates to the method of example 20, wherein the first wireless communication protocol is Bluetooth low energy (BLE) and second first wireless communication protocol is Wi-Fi.

Example 22 relates to the method of example 20, wherein the circuitry is further configured to one of transmit a BLE advertisement or to scan for a BLE advertisement.

Example 23 relates to the method of example 22, wherein the circuitry is further configured to determine the first time-offset as a function of one or more least significant bits of a shared time data ($N_0$) communicated by the broadcast beacon signal.

Example 24 relates to the method of example 23, wherein the circuitry is further configured to communicate the shared time data ($N_0$) to the other apparatus.

Example 25 relates to the method of example 20, wherein the circuitry is further configured to select one of a plurality of beacon signals to provide a large timestamp value.

While the principles of the disclosure have been illustrated in relation to the exemplary embodiments shown herein, the principles of the disclosure are not limited thereto and include any modification, variation or permutation thereof.

What is claimed is:

1. An apparatus including one or more processors and circuitry to synchronize communication with another apparatus in compliance with a first wireless communication protocol, the circuitry configured to:
   determine a first time-offset value from an Access Point broadcast beacon signal in compliance with a second wireless communication protocol;
   select an event time window as a function of the first time-offset value; and
   conduct communication with the other apparatus in compliance with the first wireless communication protocol during the event time window;
   wherein the circuitry is further configured to determine the first time-offset as a function of one or more least significant bits of a shared time data ($N_0$) communicated by the broadcast beacon signal.

2. The apparatus of claim 1, wherein the first wireless communication protocol is Bluetooth low energy (BLE) and the second first wireless communication protocol is Wi-Fi.

3. The apparatus of claim 1, wherein the circuitry is further configured to one of transmit a BLE advertisement or to scan for a BLE advertisement.

4. The apparatus of claim 1, wherein the circuitry is further configured to communicate the shared time data ($N_0$) to the other apparatus.

5. The apparatus of claim 1, wherein the circuitry is further configured to select one of a plurality of beacon signals from one of a plurality of APs to select a largest timestamp value.

6. The apparatus of claim 1, wherein the circuitry is further configured to selectively place a part of the processor in sleep mode when inactive.

7. A system to synchronize a Low-Energy Bluetooth (BLE) device, comprising:
   a memory;
   a first radio to communicate in compliance with a first wireless communication protocol and a second radio to communicate in compliance with second wireless communication protocol;
   one or more processors and circuitry to synchronize communication with another apparatus in compliance with a first wireless communication protocol, the circuitry configured to:
   determine a first time-offset value from an Access Point broadcast beacon signal in compliance with a second wireless communication protocol;
   select an event time window as a function of the first time-offset value; and
   conduct communication with the other apparatus in compliance with the first wireless communication protocol during the event time window;
   wherein the circuitry is further configured to determine the first time-offset as a function of one or more least significant bits of a shared time data ($N_0$) communicated by the broadcast beacon signal.

8. The system of claim 7, further comprising one or more antennas to receive the broadcast beacon signal.

9. The system of claim 7, wherein the first wireless communication protocol is Bluetooth low energy (BLE) and the second wireless communication protocol is Wi-Fi.

10. The system of claim 7, wherein the circuitry is further configured to one of transmit a BLE advertisement or to scan for a BLE advertisement.

11. The system of claim 7, wherein the circuitry is further configured to communicate the shared time data ($N_0$) to the other apparatus.

12. The system of claim 7, wherein the circuitry is further configured to select one of a plurality of beacon signals from one of a plurality of APs to select a largest timestamp value.

13. The system of claim 7, wherein the circuitry is further configured to selectively place a part of the processor in sleep mode when inactive.

14. A tangible machine-readable non-transitory storage medium that contains instructions, which when executed by one or more processors result in performing operations comprising: determining a first time-offset value from an Access Point broadcast beacon signal in compliance with a second wireless communication protocol; selecting an event time window as a function of the first time-offset value; and communicating with the other apparatus in compliance with a first wireless communication protocol during the event time window; wherein the instructions further result in determining the first time-offset as a function of one or more least significant bits of a shared time data ($N_0$) communicated by the broadcast beacon signal.

15. The tangible machine-readable non-transitory storage medium of claim 14, wherein the first wireless communication protocol is Bluetooth low energy (BLE) and the second wireless communication protocol is Wi-Fi.

16. The tangible machine-readable non-transitory storage medium of claim 14, wherein the
instructions further result in transmitting a BLE advertisement or to scan for a BLE advertisement.

17. A method to synchronize a first Low-Energy Bluetooth (BLE) apparatus with another apparatus in compliance with a first wireless communication protocol device, the method comprising:
determining a first time-offset value from an Access Point broadcast beacon signal in compliance with a second wireless communication protocol;
selecting an event time window as a function of the first time-offset value; and
communicating with the other apparatus in compliance with the first wireless communication protocol during the event time window; wherein the circuitry is further configured to determine the first time-offset as a function of one or more least significant bits of a shared time data ($N_0$) communicated by the broadcast beacon signal.

18. The method of claim 17, wherein the first wireless communication protocol is Bluetooth low energy (BLE) and the second wireless communication protocol is Wi-Fi.

19. The method of claim 17, wherein the circuitry is further configured to one of transmit a BLE advertisement or to scan for a BLE advertisement.

20. The method of claim 17, wherein the circuitry is further configured to communicate the shared time data ($N_0$) to the other apparatus.

21. The method of claim 17, wherein the circuitry is further configured to select one of a plurality of beacon signals from one of a plurality of APs to select a largest timestamp value.

* * * * *